United States Patent
Wilson et al.

(10) Patent No.: US 7,418,556 B2
(45) Date of Patent: Aug. 26, 2008

(54) ACCESSING MEMORY AND PROCESSOR CACHES OF NODES IN MULTI-NODE CONFIGURATIONS

(75) Inventors: James C Wilson, Los Gatos, CA (US); Wolf-Dietrich Weber, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 10/917,815

(22) Filed: Aug. 13, 2004

(65) Prior Publication Data

US 2005/0021910 A1 Jan. 27, 2005

Related U.S. Application Data

(62) Division of application No. 09/874,189, filed on Jun. 4, 2001, now Pat. No. 6,799,217.

(51) Int. Cl.
*G06F 12/08* (2006.01)
*G06F 13/14* (2006.01)

(52) U.S. Cl. .................. 711/141; 709/216; 711/146

(58) Field of Classification Search .................. None
See application file for complete search history.

(56) References Cited

U.S. PATENT DOCUMENTS

| | | | |
|---|---|---|---|
| 5,887,146 A * | 3/1999 | Baxter et al. ................ 710/104 |
| 6,021,451 A | 2/2000 | Bell et al. | |
| 6,085,274 A | 7/2000 | Seeman | |
| 6,134,619 A | 10/2000 | Futral et al. | |
| 6,338,122 B1 * | 1/2002 | Baumgartner et al. ....... 711/141 |
| 6,389,479 B1 | 5/2002 | Boucher et al. ............. 709/243 |
| 6,467,012 B1 * | 10/2002 | Alvarez et al. ............... 710/316 |

(Continued)

FOREIGN PATENT DOCUMENTS

JP 2000-78200 3/2000

OTHER PUBLICATIONS

University of Notre Dame, Computer Science and Engineering Courses handout [online], Oct. 12, 2000 [retrieved on Dec. 19, 2001] <URL: http://www.cse.nd.edu/academics/courses/courses.htm.

(Continued)

*Primary Examiner*—Gary J Portka
(74) *Attorney, Agent, or Firm*—Fenwick & West LLP

(57) ABSTRACT

A method for communicating between nodes of a plurality of nodes is disclosed. Each node includes a plurality of processors and an interconnect chipset. The method issues a request for data from a processor in a first node and passes the request for data to other nodes through an expansion port (or scalability port). The method also starts an access of a memory in response to the request for data and snoops a processor cache of each processor in each node. The method accordingly identifies the location of the data in either the processor cache or memory in the node having the processor issuing the request or in a processor cache or memory of another node. A method for requesting data between two directly coupled nodes in a router system is also disclosed. A method for requesting data between three or more nodes in an interconnect system is also disclosed. A method for resolving crossing cases in an interconnect system is also disclosed. An interconnect system for coupling nodes directly or through a protocol engine is also disclosed.

7 Claims, 9 Drawing Sheets

U.S. PATENT DOCUMENTS

| | | | |
|---|---|---|---|
| RE38,428 E | 2/2004 | Kelly et al. | |
| 6,859,866 B2 | 2/2005 | Westcott et al. | |
| 6,957,290 B1 | 10/2005 | Rowlands et al. | |
| 7,167,957 B2 * | 1/2007 | Khare et al. | 711/151 |
| 2001/0021967 A1 | 9/2001 | Tetrick | |

OTHER PUBLICATIONS

Office Action and Translation of Office Action; Japanese Patent Application No. 2002-163097, Mar. 27, 2007, 6 pages.

Office Action and Translation of Office Action; Japanese Patent Application No. 2002-163097, Jun. 28, 2007, 5 pages.

* cited by examiner

ACCESSING MEMORY AND PROCESSOR CACHES OF NODES IN MULTI-NODE CONFIGURATIONS

CROSS REFERENCE TO RELATED APPLICATIONS

This application is a divisional of, and claims priority to, U.S. patent application Ser. No. 09/874,189, filed Jun. 4, 2001, entitled "Shared Memory Multiprocessor Expansion Port for Multi-Node Systems", now U.S. Pat. No. 6,799,217, the contents of which are herein incorporated by reference. It is noted that this divisional application arises from a restriction requirement from the U.S. Patent and Trademark Office dated Jun. 9, 2004 in the parent application.

This application is related to U.S. patent application Ser. No. 10/917,682, filed on Aug. 13, 2004, entitled "Resolving Crossing Requests in Multi-Node Configurations", the contents of which are hereby incorporated by reference.

BACKGROUND OF THE INVENTION

1. Field of the Invention

The present invention relates to ports for a shared memory node, and more particularly, to scalable ports for connecting two or more nodes together.

2. Description of the Related Art

Conventional scalable multiprocessors consist of multiple nodes that are connected together using an interconnect system. Each node consists of a processor, dynamic random access memory (DRAM), and an input/output (I/O) device. The processor, DRAM, and I/O device couple with a bus. A single chipset also couples with the bus and controls interactions between all of the components.

The single chipset also couples with a conventional interconnect port. A conventional interconnect port is an external interface that allows for physically connecting nodes together in an interconnect system. Connecting multiple nodes together may allow for creation of a shared memory system. An example of a shared memory system is a Cache Coherent, Non-Uniform Memory Access (CC-NUMA) architecture.

In an interconnect system, to connect one node to another node requires an interconnect port. Where there are only two nodes, the interconnect port is optimized for communication between these two nodes only. A dedicated interconnect port in two node systems is more popular and more commonly in use than systems having three or more nodes. However, because the interconnect port is also dedicated for such two node systems, the interconnect port is not scalable beyond two nodes.

Interconnecting more than two nodes requires adding additional hardware between the interconnect port and each additional node. This additional hardware is used to scale the ports. The additional hardware also increases the overall cost of the system. Further, the additional hardware requires additional system space making it less suitable for limited space environments and applications. The additional hardware also increases the number of signal delay points that, in turn, causes a decrease in overall system performance. The additional hardware and the problems it introduces is another reason why such conventional interconnect ports are not desirable for systems with only two nodes.

In summary, some problems with conventional interconnect systems are that there may be a need for up to three different types of interconnect ports when adding or removing nodes from the interconnect system. If there is only one node, no interconnect port is needed. If there are two nodes, a non-scalable interconnect port is needed. If there are three or more nodes, a scalable interconnect port is needed. However, this scalable interconnect port is inefficient for two node systems.

Therefore, there is a need for an interconnect port that (1) is scalable, (2) has high performance in systems having three or more nodes, as well as two node systems, and (3) does not increase system costs when additional nodes are added to the system.

SUMMARY OF THE INVENTION

An interconnect system of the present invention includes nodes that are coupled together and communicate with each other. The interconnect system may include one node, two nodes, and more than two nodes. In the interconnect system with one node, because there is only that node, there is no interconnect. In a two node system, both nodes may be directly connected to each other to form the interconnect system. In a more than two node system, each node does not directly connect to each other node. Rather, each node includes a protocol engine and all of the protocol engines couple together to form the interconnect system. Generally, each node includes a node control unit, a memory system, an input/output ("I/O") system, and one or more processing units, e.g., central processing units. Each processing unit includes an associated processor cache in which data may be stored.

In both the two node and more than two node case, the nodes couple together through an interconnect port. The interconnect port may be referred to as a scalability or expansion port. The interconnect port includes a physical layer, a signal protocol layer, a command protocol layer, and a coherence protocol layer. The physical layer receives or transmits signals. The signal protocol layer makes use of the physical layer and defines a relationship with either the received or the transmitted signal. The command protocol layer couples to the signal protocol layer and generates either a request for data in response to the received signal or a reply in response to preparing the transmitted signal. The coherence protocol layer makes use of the command protocol layer and provides a set of legal transactions for data in response to either the request for data or the reply.

The physical layer, the signal protocol layer and the command protocol layer are symmetrical layers. The coherence protocol layer is an asymmetrical layer. This advantageous design of the interconnect port allows for universal application of the port to both two node and three or more node interconnect systems. The symmetrical design and structure of the port allows for each node in the interconnect system to be both a master and a slave. For example, in a two node interconnect system, the port allows for direct connection of two nodes. This provides operational efficiencies for the interconnect system so that both nodes can be a master and a slave and accordingly source requests and/or process requests. Further, the symmetrical nature of the port allows for connecting three or more nodes in an interconnect system, without requiring additional system components or resources.

The present invention also includes memory accesses with and without pipelining. More particularly it includes local and remote coherence protocols that permit legal transactions for dual and multi-node systems. In a pipelined environment, the present invention increases overall system speed for data access because there is a latency reduction. For example, the present invention allows for a speculative snoop and a speculative memory access to occur even as a local memory access for data is occurring. Further, when a directory determines that data resides remotely, it does not need to wait for a follow-up to begin access of this data. This increases overall system efficiency and reduces latency.

The present invention also handles crossing cases. In a crossing case, one side (or node) sends a request to the other side (or node) for a particular address and receives a request for this address from the other side before receiving a reply to its request. An advantage of handling crossing cases as in the present invention is that such cases may be resolved without discarding (or killing) subsequent processor requests. Rather, the subsequent request for data is beneficially processed after the request that preceded it. Moreover, in some instances the subsequent request is advantageously processed before the preceding request, for example, when a particular request may not be retried.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE PREFERRED EMBODIMENTS

The figures depict a preferred embodiment of the present invention for purposes of illustration only. One skilled in the art will readily recognize from the following discussion that alternative embodiments of the structures and methods illustrated herein may be employed without departing from the principles of the claimed invention.

Scalable Nodes

The present invention includes a scalable interconnect port that allows for connecting two or more nodes in an interconnect system (e.g., a routing system). The scalable interconnect port is advantageously symmetrical so that it can be used efficiently with two nodes or with more than two nodes. This beneficially decreases the amount of additional hardware in an interconnect system.

The interconnect system communicatively couples the two or more scalable nodes so that instructions, data, and other signals may be passed between each scalable node. Each scalable node includes a processing unit, e.g., a central processing unit, that processes the instructions, data, or other signals within the interconnect system.

Figure 1:
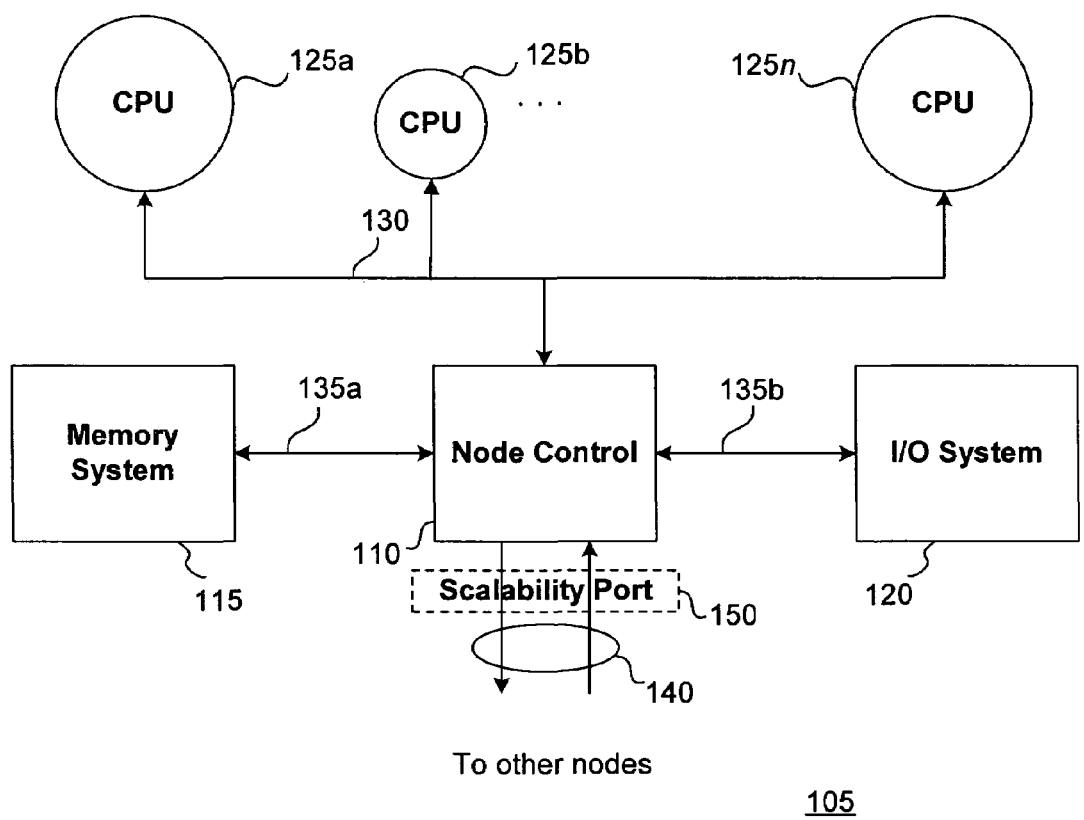
FIG. 1 is a block diagram of one embodiment of a scalable node in accordance with the present invention.

FIG. 1 is a block diagram of one embodiment of a scalable node 105 in accordance with the present invention. The scalable node 105 includes a node control unit 110, a memory system 115, an input/output ("I/O") system 120, and one or more processing units, e.g., central processing units 125a-125n (generally 125). The memory system 115 is a conventional memory system, for example, a dynamic random access memory system, a static random access memory system, or the like. The I/O system 120 is a conventional I/O system, for example, a storage device, an input device, a peripheral device, or the like. The central processing unit 125 is a conventional processing unit, for example, an Intel or Intel-compatible Pentium™ class or higher processor, a Sun SPARC™ class or higher processor, or an IBM/Motorola PowerPC™ class or higher processor.

The node control 110 communicatively couples with the memory system 115 through a first set of signal lines 135a and communicatively couples with the I/O system 120 through a second set of signal lines 135b. In addition, the node control 110 communicatively couples with each of the central processing units 125a-125n through a third set of signal lines 130. The first set of signal lines 135a, the second set of signal lines 135b, and the third set of signal lines 130 may be any signal communication medium, for example, a data bus, one or more data wires, or the like.

The node control 10 also forms a portion of a scalable (or scalability) port (or scalable interconnect port) 150, with the other portion of the scalability port formed by another node control of another scalable node. Specifically, the node control 110 communicatively couples one or more other nodes through a node signal line 140. The node signal line 140 may directly couple with a node control of another node or it may directly couple with an interconnect system. As will be further described below, the scalability port 150 allows for coupling two scalable nodes back-to-back and it allows for coupling three or more scalable nodes together in an interconnect system. It is noted that the scalability port may also be considered an expansion port.

Generally, the interconnect system may include one node, two nodes, and more than two nodes. The interconnect system with one node does not need an interconnect because there is only one node in the interconnect system. In a two node system, both nodes may be directly connected to each other to form the interconnect system. In a more than two node system, each node does not directly connect to each other node. Rather, each node includes a protocol engine, e.g., 340, and all of the protocol engines couple together to form the interconnect system.

Figure 2A:
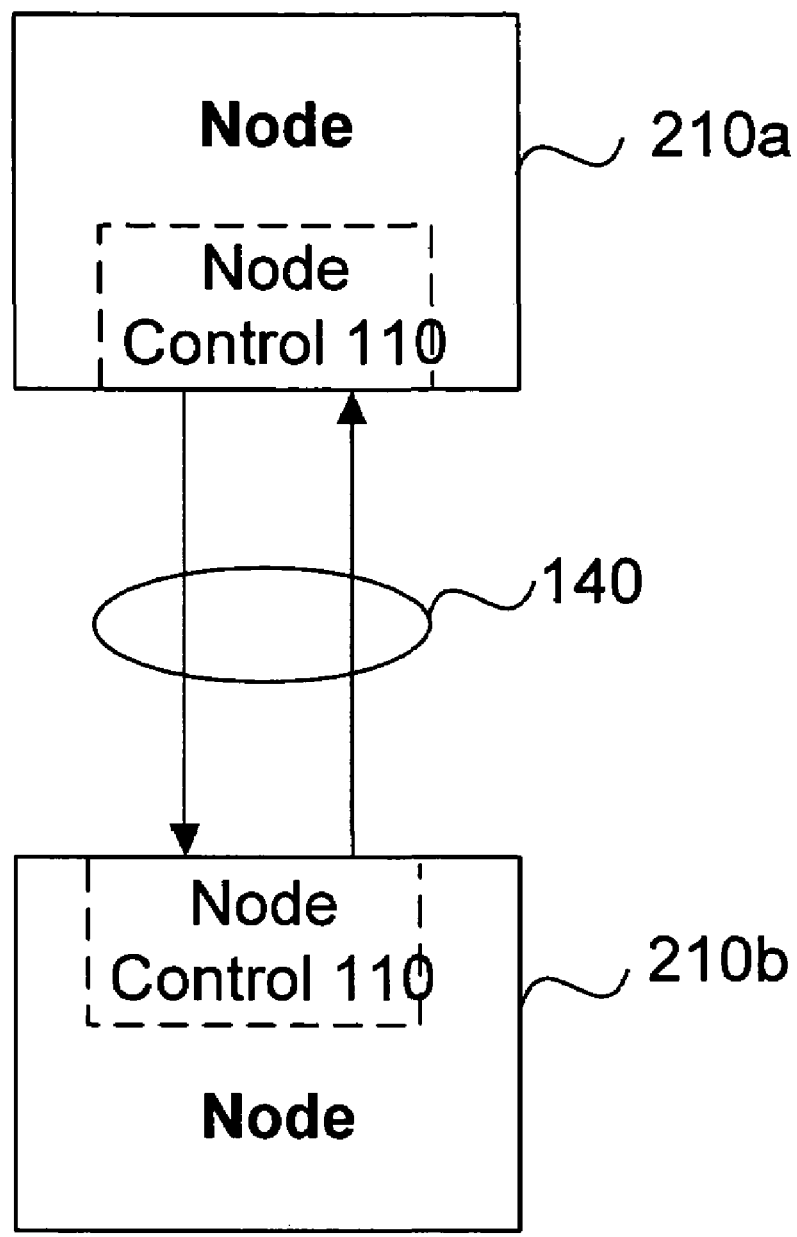
FIG. 2a is a block diagram of one embodiment of a small system configuration having a first node and a second node in accordance with the present invention.

FIG. 2a is a block diagram of one embodiment of a two-node interconnect system in accordance with the present invention. The two-node interconnect system configuration includes a first scalable node 210a and a second scalable node 210b. Each scalable node 210a, 210b is functionally equivalent to the scalable node 105 described above in FIG. 1. The first scalable node 210a and the second scalable node 210b can communicatively couple back-to-back through one or more node signal lines 140 without requiring additional system components. More specifically, each node in the two-node interconnect system configuration is symmetrical. That is, each node can function as a master (e.g., source a request) and a slave (e.g., process a request).

During operation of the interconnect system, the first scalable node 210a and the second scalable node 210b may transmit instruction and data signals directly between each other through the node signal line 140. Again, no additional components are required in the small system configuration because the scalable nodes are symmetrical. A scalability port, e.g., scalability port 150, associated with each scalable node 210a, 210b ensures that there is symmetry between the scalable nodes 210a, 210b. This reduces overall system costs because no additional hardware, software, or firmware such as a protocol engine is necessary to couple and operate the scalable nodes in a back-to-back configuration.

Figure 2B:
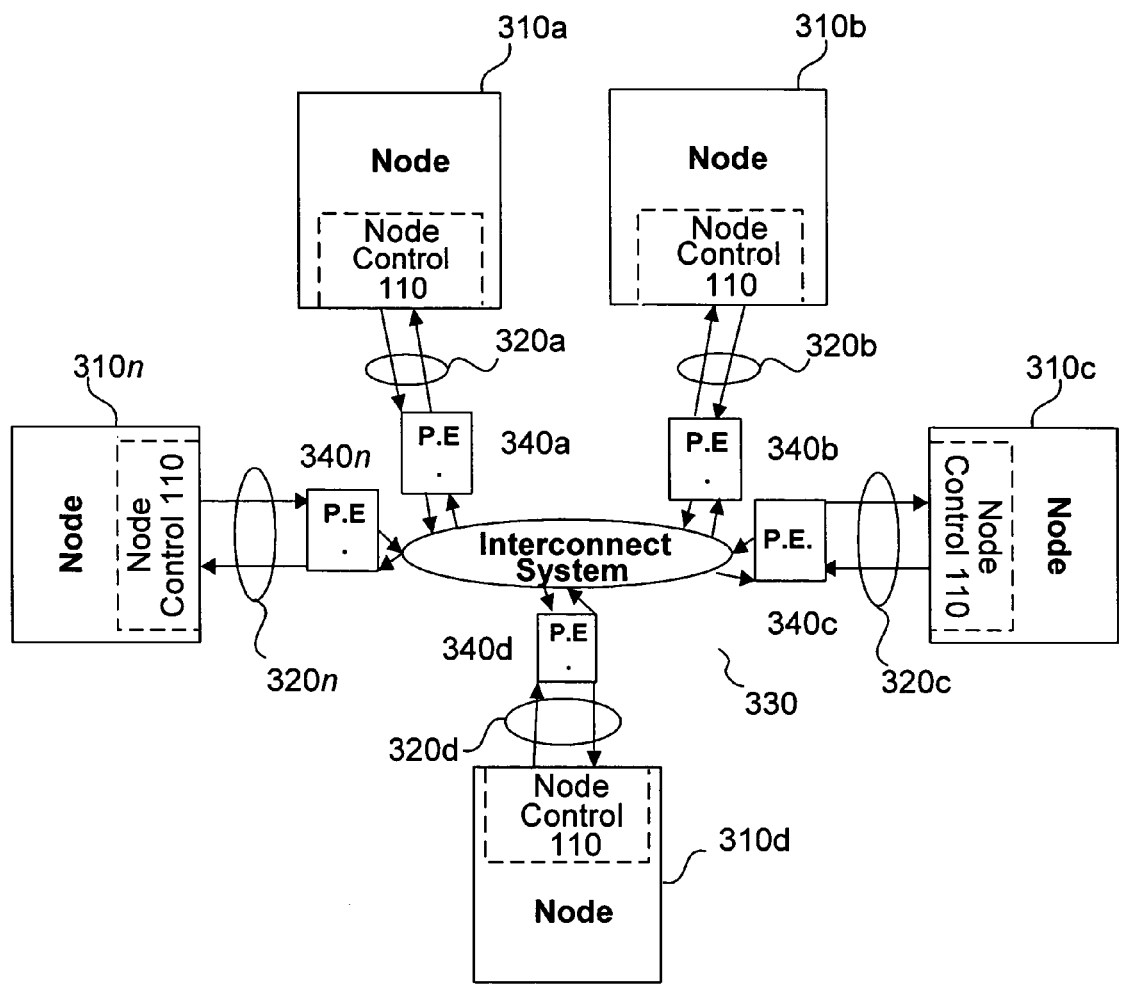
FIG. 2b is a block diagram of one embodiment of a large system configuration including, for example, five nodes, in accordance with the present invention.

FIG. 2b is a block diagram of one embodiment of a multi-node (more than two nodes) interconnect system configuration in accordance with the present invention. The multi-node interconnect system configuration includes three or more scalable nodes 310a-310n (generally 310), node control lines 320a-320n (generally 320), protocol engines 340a-340n (generally 340), and an interconnection system 330. Each scalable node 310a-310n is functionally equivalent to the scalable node 105 described above in FIG. 1. Each scalable node 310a-310n couples with the interconnection system 330 through its respective node control lines 320a-320n. The protocol engines 340a-340n allow for communication between the nodes 310a-310n.

Each scalable node 310 includes a scalability port, e.g., the scalability port 150, through which communication between the nodes is achieved. An advantage of including the scalability port 150 within the scalable none 310, is that it allows for coupling two scalable nodes, e.g., 210, back-to-back and it allows for coupling three or more scalable nodes 310 together through the interconnect system 330. The scalable node, e.g., 105, 210, 310, requires no additional components regardless of the communication coupling configuration it uses. Thus, regardless of whether scalable nodes couple back-to-back or through the interconnect system 330, a scalable node of the present invention provides for an efficient and flexible communication protocol.

Figure 3:
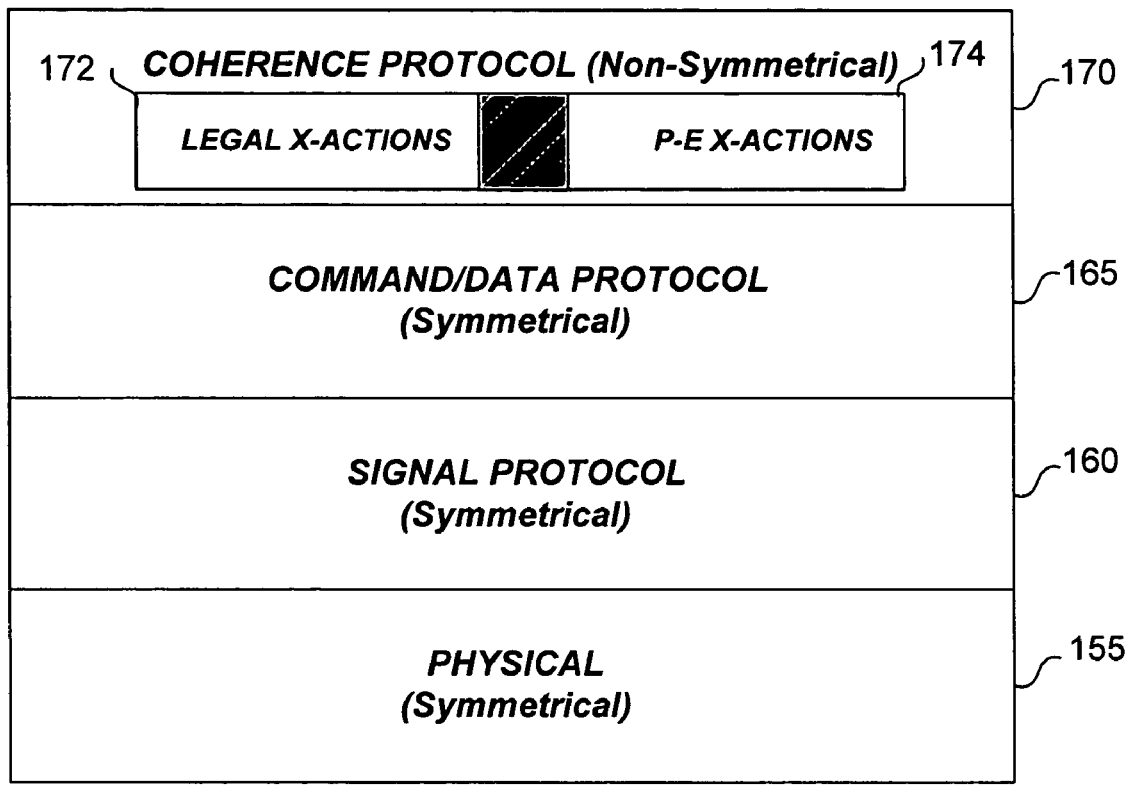
FIG. 3 is a diagram of one embodiment of the protocol layering of a scalability port in accordance with the present invention.

FIG. 3 illustrates one embodiment of the protocol layering of a scalability port 150 in accordance with the present invention. In a preferred embodiment, the scalability port 150 comprises a communication protocol that is configured similar to a stacked structure. Specifically, the scalability port 150 includes a physical layer 155, a signal protocol layer 160, a command/data protocol layer 165, and a coherence protocol layer 170. The physical layer 155 communicatively couples the signal protocol layer 160. The signal protocol layer 160 communicatively couples the command/data protocol layer 165. The command/data protocol layer 165 couples the coherence protocol layer 170. The physical layer 155, the signal protocol layer 160, and the command/data protocol layer 165 are symmetrical layers. Thus, signals and responses passing to and from these layers are symmetrical. For example, each request has a corresponding reply and vice-versa. The fourth layer, the coherence protocol layer 170, is not symmetric so that it can break deadlocks that may arise within the interconnect system.

The physical layer 155 defines the input and output connections or "pins" that are present on an integrated circuit chip or chipset. The signal protocol layer 160 defines what signals in the system do and their timings. The signal protocol layer 160 also determines when valid transactions occur within the interconnect system. The command/data protocol layer 165 functions in a request and response type mode. In particular, the command/data protocol layer 165 functions to issue or receive commands (including instructions) and data that is either requested or provided in response to a request for one or the other.

The coherence protocol layer 170 defines legal transactions to maintain a global coherence protocol between processors on different nodes. That is, the coherence protocol layer 170 defines the rules for a given transaction involving the scalability port 150. The rules define permitted transactions when a scalable node couples directly with another scalable node (legal transaction component 172) and when a scalable node couples with an interconnect system (protocol engine component 174).

Memory Access With and Without Pipelining

Figure 4A:
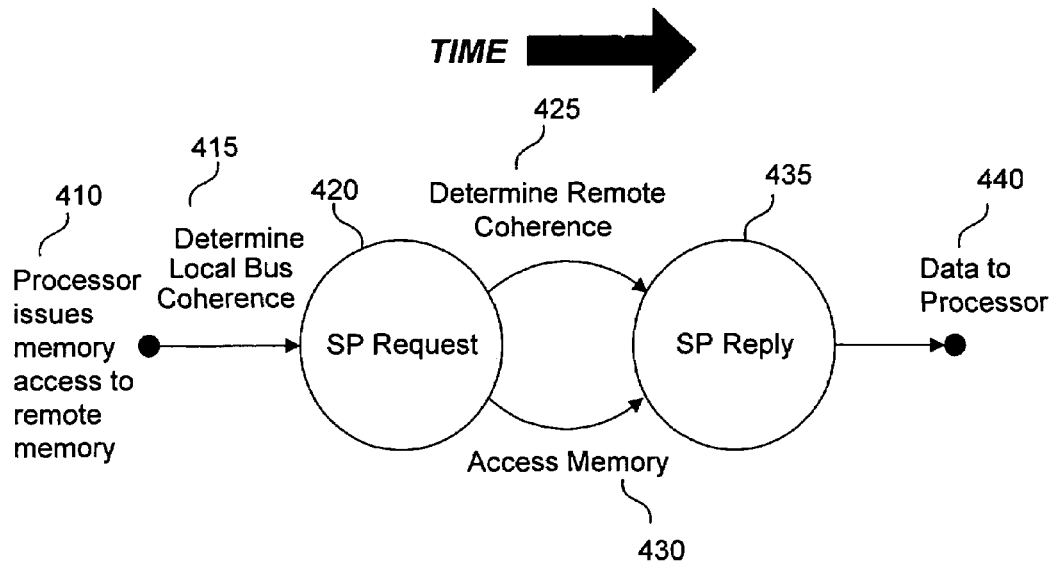
FIGS. 4a and 4b are process timing diagrams for one embodiment of local and remote memory access without pipelining using a scalable node having a scalability port in accordance with the present invention.
Figure 4B:
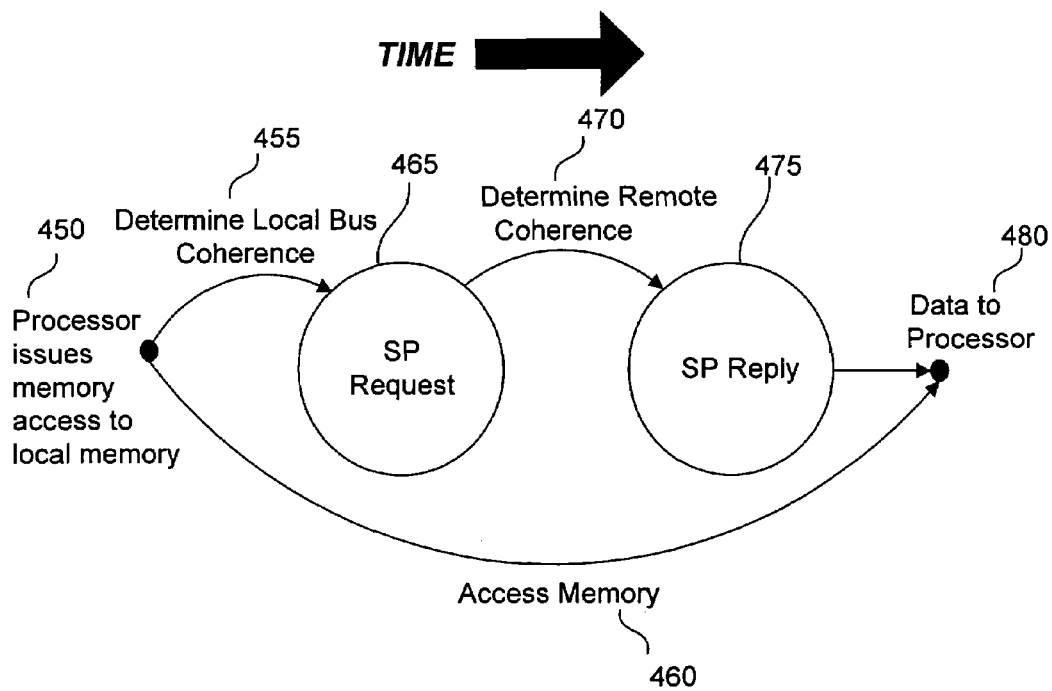

FIGS. 4a and 4b are process timing diagrams for embodiments using remote and local memory access without pipelining using the scalable node 105 having the scalability port 150 in accordance with the present invention. In particular, the Figures illustrate the timings and dependencies of various actions that take place when servicing a local memory access and a remote memory access. These timings and dependencies are shown when the scalability port 150 of the scalable node 105 uses a simple request/reply command set rather than a pipelined command set.

It should be understood that although the present description is with regard to requests for memory, one skilled in the art will understand that the principles and concepts described herein are also applicable to other processor requests, for example, input/output requests, command requests, resource requests, and the like. Each processor request includes a content which may be, for example, a request for data or input/output resources. For simplicity, the processor requests will be generally referred to as requests for data.

In addition, it will be understood by those skilled in the art that a request for data includes providing a memory system address in which the data is located. A description involving a "local" action includes an action at a node in which a processor issued a request for data. Actions at other nodes involve "remote" action. For example, the processor 125 request for local memory access involves accessing the memory system 115 within the scalable node 105 in which that processor 125 is located. This scalable node 105 may be referred to as a local node in this case. A request for remote memory access involves accessing the memory system of another scalable node. This scalable node may be referred to as a remote node in this case.

FIG. 4a illustrates a remote memory access in which data is located in a remote node. In this case, a processor 125 issues 410 a memory access to remote memory to locate data. The node control 110 then determines 415 coherence on the local bus of the processor 125 that issued the request for data. The coherence checks each processor on the local bus to see if it has a modified copy of the data (or line) in its cache. If so, the data will be supplied by that processor. In one embodiment, the determination 415 of the coherence on the local bus is a serialized process. The scalability port, e.g., 150, can support any coherence protocol. Those of skill in the art will recognize the various coherence protocols that may be applicable.

Next, the process issues 420 a scalability port request for data. This request is to get the data from where it is currently located. Specifically, this request includes a determination 425 of remote coherence and an access 430 of a remote memory system at a remote node. In one embodiment, the determination 425 and the access 430 are conceptually separate, but function serially.

Determining 425 remote coherence may differ in a two-node system verses a multi-node system. In a two-node system, determining 425 remote coherence involves a snoop (i.e., a query for data) of the remote bus. In a multi-node system, determining 425 remote coherence involves performing a directory look-up operation. The directory look-up operation provides the information on data stored in memory systems at other nodes. In a preferred embodiment, the directory is a table that is located in a memory or register that is separate from the protocol engine 340 and the other components of the node 105. In an alternative embodiment, the directory is located in a memory or register within the protocol engine 340. Accessing 430 the remote memory includes accessing remote memories and snooping remote processor caches at the remote nodes for the data.

Once the data is found through the remote coherence or memory access operations, the data process prepares and issues 435 a scalability port reply message. This message includes the data that was requested by the processor 125. The data is then sent 440 to the processor 125.

FIG. 4b illustrates a local memory access in which data is located at the local node. In this case, a processor 125 issues 450 a memory access 460 to locate data in the local memory system 115. This data can be sent 480 directly to the processor 125 that requests the data. Simultaneously, the process determines 455 coherence on the local bus of the processor 125 that issued the memory access for data. The process then issues 465 a scalability port request for a coherence check. This request is to get the data from where it is currently located. Specifically, this request includes a determination 470 of remote coherence. As discussed above, the determination 470 of remote coherence includes a bus snoop in a two-node system or a directory look-up in a multi-node system to determine whether the data is located at another node. Although the data is local, the directory look-up is necessary to determine whether a remote processor has cached the data at that remote node.

If the data is cached at the remote node, the data is retrieved from that remote cache. Specifically, if data is located at a remote node the process prepares to issue 475 a scalability port reply that includes the data for the requesting processor. The data is then sent 480 to the processor 125. Again, it is noted that the determination 455 of local bus coherence and the determination 470 of remote coherence are both serialized processes. In order to allow data to be retrieved correctly, the local node must wait for a response from the scalability port before returning data to allow for a remote cache case. Because the local coherence is serialized with remote coherence, the response can be late, thus degrading performance. The pipelining process avoids this and provides increased data throughput performance.

Figure 5A:
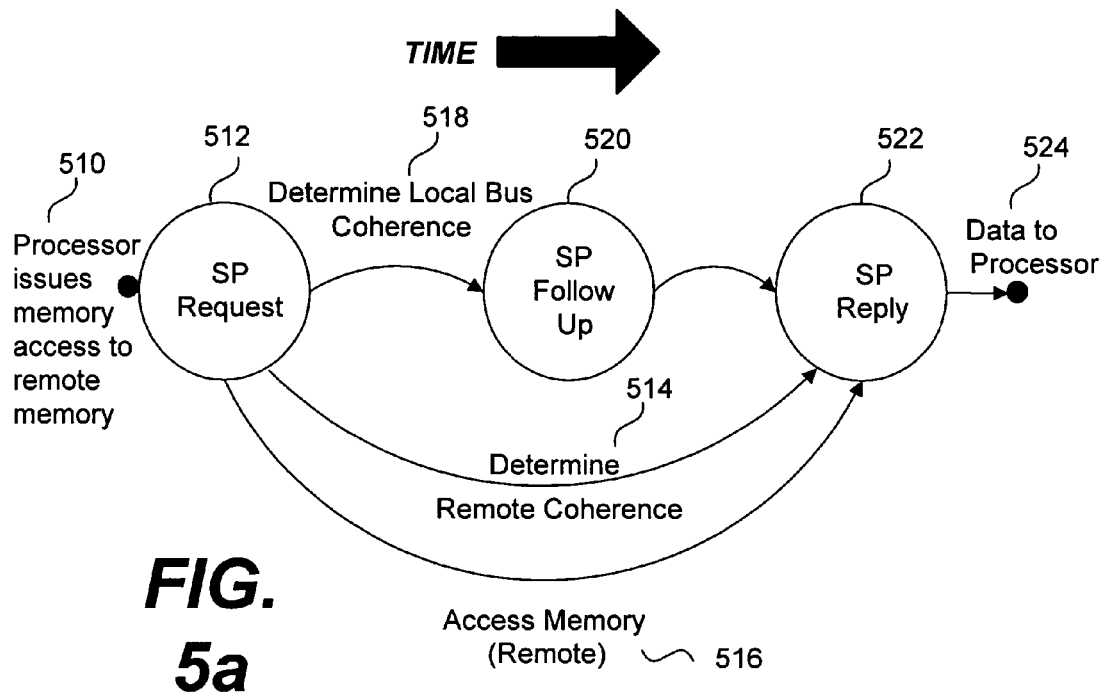
FIGS. 5a, 5b, and 5c are process timing diagrams for one embodiment of local and remote memory access with pipelining using a scalability port in accordance with the present invention.
Figure 5B:
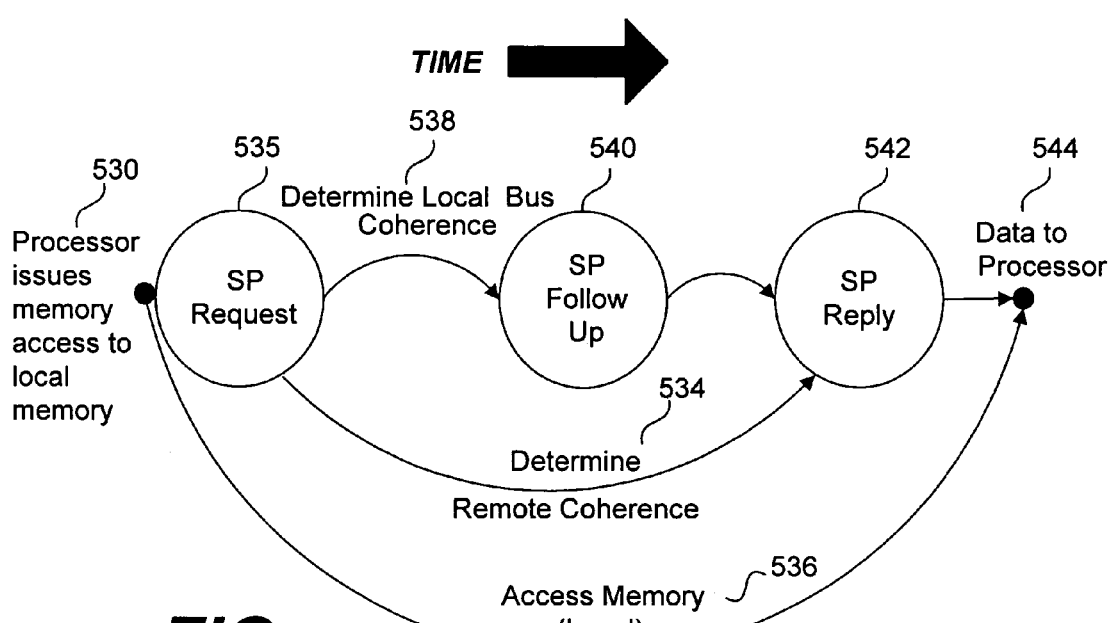
Figure 5C:
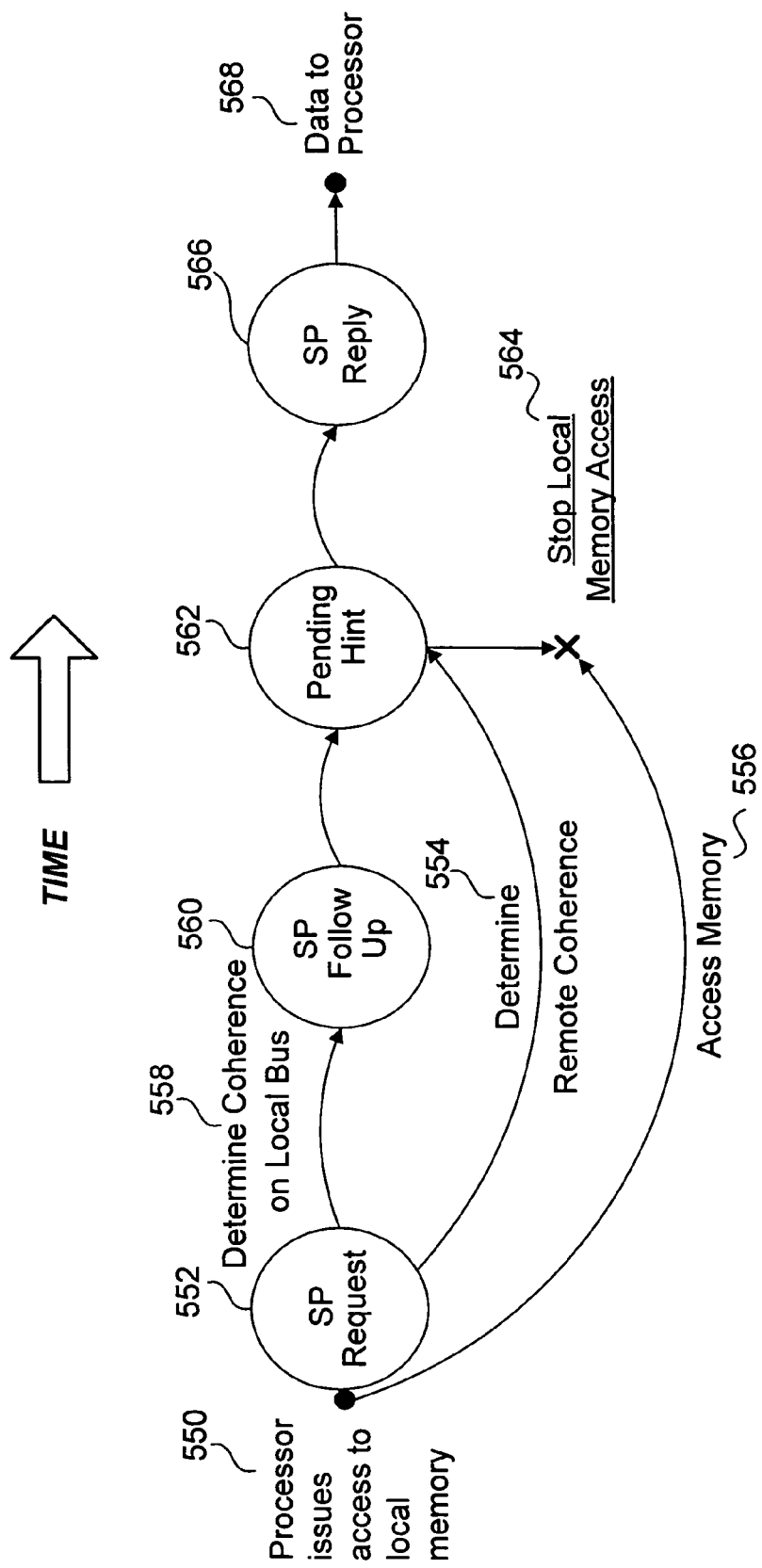

FIGS. 5a, 5b, and 5c are process timing diagrams for one embodiment of local and remote memory access with pipelining using a scalability port in accordance with the present invention. FIG. 5a is a process timing diagram for memory access with pipelining to remote memory. The process commences when the processor 125 issues 510 a memory access to remote memory. The process then prepares to issue 512 a scalability port request for data. The process then goes out and gets the data. Specifically, the process accesses 516 remote memory, determines 518 coherence at the local bus, and determines 514 remote coherence.

The access 516 to remote memory includes accessing the memory systems of remote nodes to locate the data. The determination 518 of local bus coherence includes a memory snoop for data on the local bus where the processor 125 issuing the memory access is located. This process determines whether the data is cached in a processor at the local node.

In a multi-node system, the determination 514 of remote coherence includes a directory look-up at the local node to determine if the data is located at a remote node. In a two-node system, the determination 514 of remote coherence includes either a speculative snoop operation or a speculative memory access operation at the remote node. In a two-node system, there is a speculative snoop operation that includes a snoop of remote caches of the remote processors at the remote nodes. This operation is referred to as speculative because the remote node is queried for data while the local node is also queried for data. This may be referred to as snooping.

When the coherence determination 518 is complete, the process issues 520 a scalability port follow-up message. This message provides the process with information as to whether the data has been located in a local cache. Once the data has been located locally or remotely, the process prepares to issue 522 a scalability port reply message that may include the located data. The data is then sent 524 to the processor 125 that requested that data.

FIG. 5b is a process timing diagram of memory access with pipelining to local memory. The process commences when the processor 125 issues 530 a memory access to the local memory system 115. The process immediately accesses 536 the local memory system 115 in a speculative manner. The process then prepares to issue 535 a scalability port request. The process continues with a determination 538 of coherence on the local bus as well as a determination 534 of coherence at the remote node. The determination 538 of local bus coherence includes a snoop in local processor caches to see if the data resides in any of these caches.

The determination 534 of remote coherence functions in one of two manners. For multi-node systems it includes a directory look-up to determine if the data is located at a remote node. This may be referred to as a speculative directory look-up. In a two-node system there is either a speculative snoop operation or a speculative memory access operation of the remote node. The speculative snoop operation includes a snoop of remote caches of the remote processors at the remote nodes. The speculative memory access operation accesses the local memory system.

Next, the process issues 540 a scalability port follow-up message. This message provides the process with information as to whether the data has been located in a local cache. The follow-up message may cancel the speculative snoops. Once the data has been located locally or remotely, the process prepares to issue 542 a scalability port reply message that includes the located data. The data is then sent 544 to the processor 125 that requested that data.

FIG. 5c is a process timing diagram of memory access with pipelining to local memory. In this case, the data is ultimately found to be in a remote node and the data is considered to be "dirty." Dirty data means that the data may have been altered at the remote node. The process commences when the processor 125 issues 550 a memory access to the local memory system 115. The process immediately accesses 556 the local memory system 115. The process then prepares to issue 552 a scalability port request. The process continues with a determination 558 of coherence on the local bus as well as a determination 554 of coherence at the remote node. The determination 558 of local bus coherence includes a snoop in local processor caches to see if the data resides in any of these caches.

The determination 554 of remote coherence is based on whether there is a multi-node system or a two-node system. In a multi-node system a directory look-up determines if the data is located at a remote node. More particularly, the directory look-up detects cache directory data, and then ultimately gets that data. In a two-node system there is either a speculative snoop operation or a speculative memory access operation of the remote node. A speculative snoop operation includes a snoop of remote caches of the remote processors at the remote nodes. A speculative memory access operation accesses the remote memory system at the remote node.

Next, the process issues 560 a follow-up message and receives a pending hint message. The pending hint is for the local side remote directory. The pending hint message cancels, or stops, 564 access to the local memory system 115. Because the data is known to be in the remote node, for example, in a cache of a processor in the remote node, the process stops 564 the access to the local memory system 115. Once the data has been retrieved from the remote node, the process prepares to issue 566 a scalability port reply message that includes the located data. The data is then sent 568 to the processor 125 that requested that data.

An advantage of the present invention is that it includes local and remote coherence protocols that permit legal transactions for dual and multi-node systems. In addition, in a pipelined environment, the present invention beneficially increases overall performance for data access because there is a latency reduction. In particular, the speculative snoop and speculative memory accesses occur even as a local memory access for data is occurring. Further, when the process directly determines that data resides remotely, it does not need to wait for a follow-up to begin access of this data. This further increases overall system efficiency and reduces latency.

Crossing Cases

In some transactions two or more scalable nodes may request the same data at, or relatively close to, the same time. These instances are referred to as crossing cases. In a crossing case, one side sends a request to the other side for a particular address and receives a request for this address from the other side before receiving a reply to its request. To resolve a crossing case, each scalable node must detect the crossing case and then follow a set of rules that assists in determining an order for processing each request (or transaction) for data so that each side of a scalability port processes the requests in the same order.

Figure 6A:
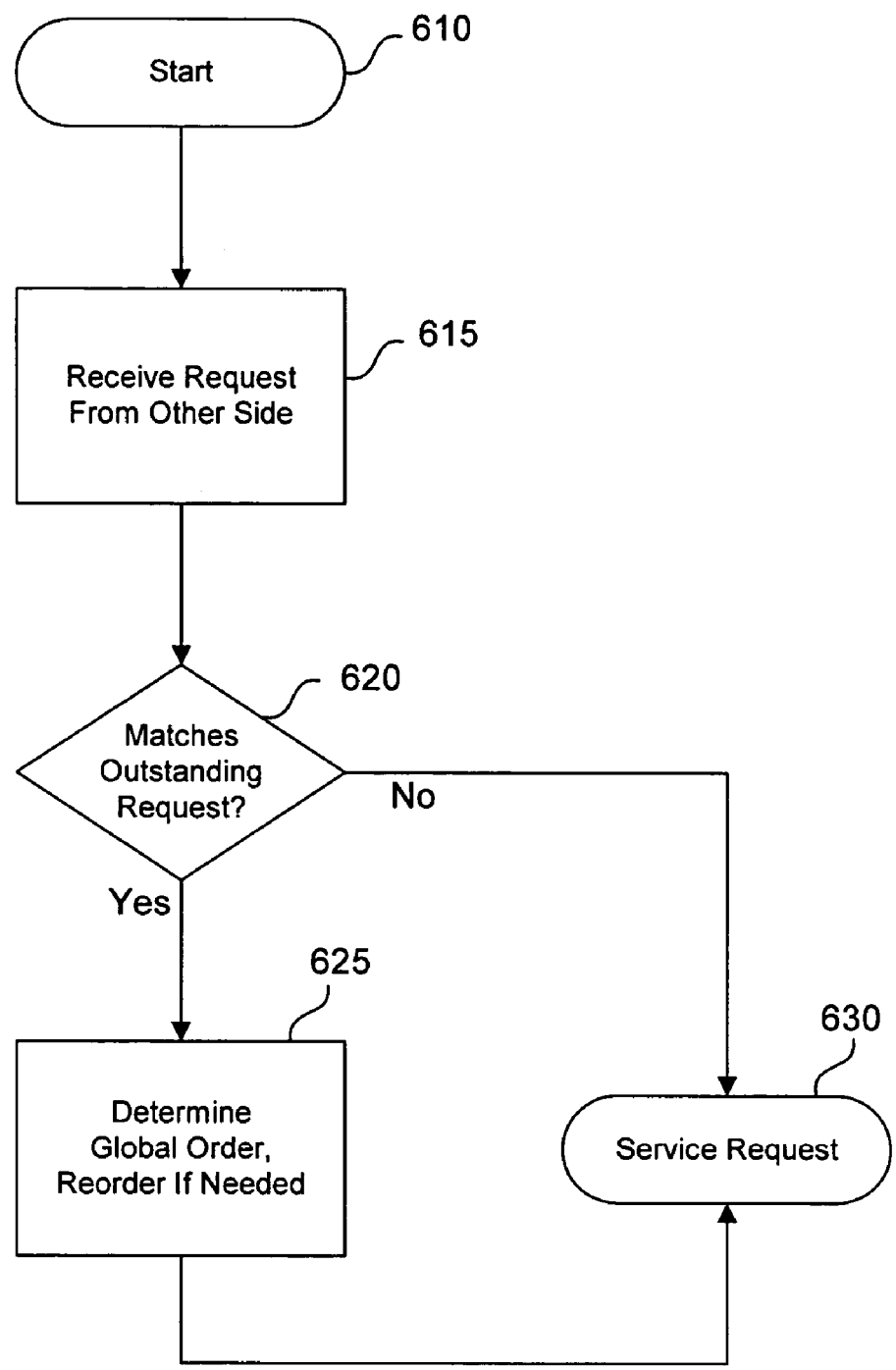
FIG. 6a is a process diagram for one embodiment of flexible crossing case resolution using a scalability port in accordance with the present invention.

FIG. 6a is a process diagram for one embodiment of a flexible crossing case resolution process using a scalability port in accordance with the present invention. The process starts 610 and receives 615 a request for data from another node. The process matches 620 this request for data with a list of outstanding requests for data. In one embodiment, the list of outstanding requests for data includes a list of addresses that is requested by a particular scalable node and a commit point for that data. The commit point is the time when the request for data by the scalable node is put in the list.

Each side of the scalability port maintains its own-commit list, which may have requests listed in different orders due to crossings of requests. The system functions to resolve crossings of requests so that both sides of the scalability port use the same order with regard to processing requests. It is noted that in one embodiment, the list of outstanding requests for data is in a table format and is stored in the memory system 115 or in a separate memory.

If there is no match 620 between the current request for data and any data in the list of outstanding requests for data, the process proceeds to service 630 the request. In one embodiment, the process services 630 the request using either a non-pipelined or a pipelined process described above in FIGS. 4a to 4b and 5a to 5c. If there is a match 620 between the current request for data and data in the list of outstanding requests for data, the process determines 625 a global order for processing the request for data. The global order process may cause a reordering in the order for servicing the data requests. One way to reorder requests is by retrying the first request such that when it is retried it comes after the second request.

Figure 6B:
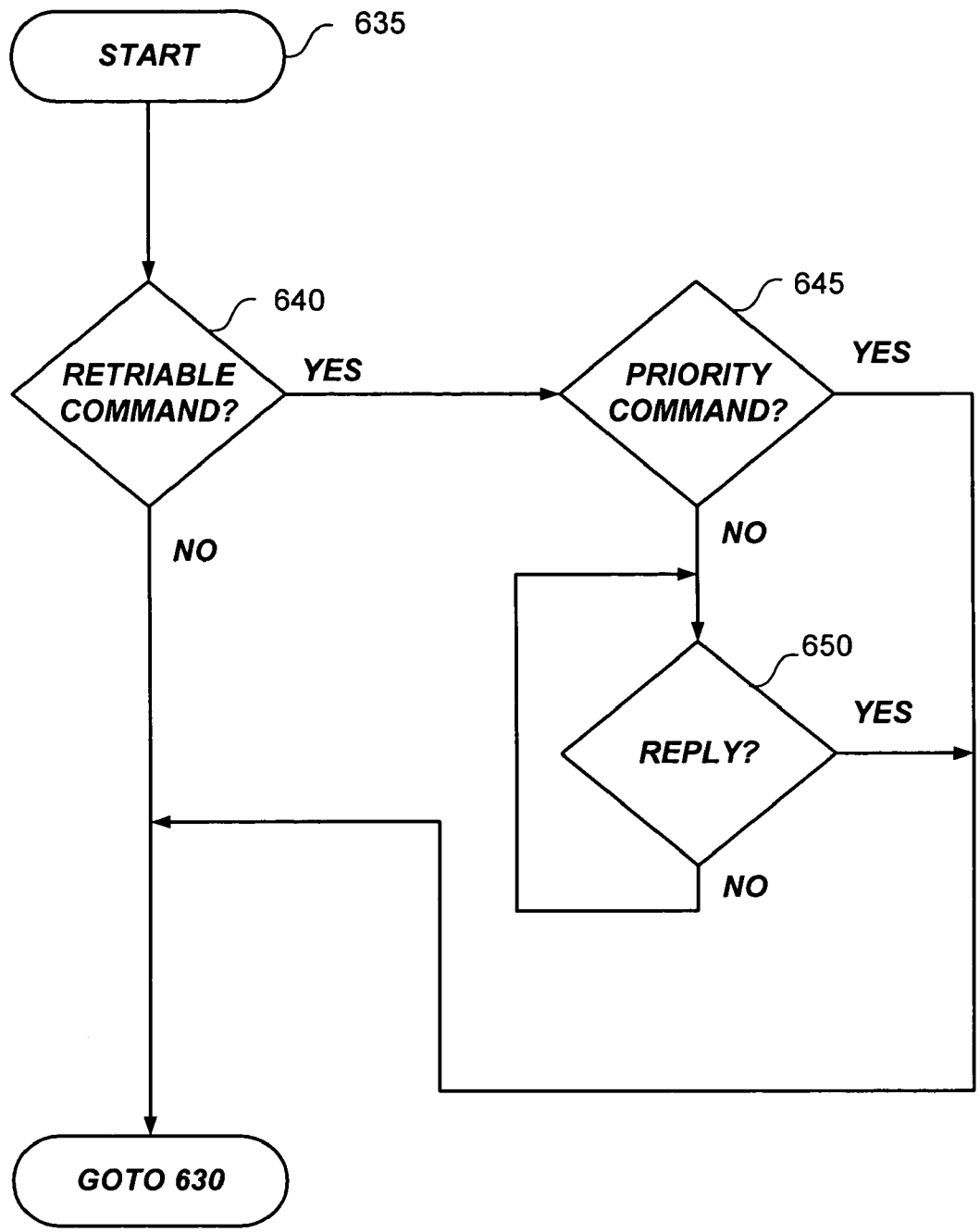
FIG. 6b illustrates one embodiment for a process to determine a global order for processing a request for data in a crossing case.

FIG. 6b illustrates one embodiment for a process to determine 625 the global order for processing the request for data. When the global order process starts 635 it determines 640 whether the request for data is a request that may not be retried. If the request for data may not be retried, the global order process allows the crossing case resolution process to service 630 the request for data at the present time. If the request for data may be retried, the global process order determines 645 if the request is a priority command. In one embodiment the cache coherence protocol allows only one side of a scalability port to issue a non-retriable request at a time.

When the request for data is a priority, the global order process allows the crossing case resolution process to service 630 the request for data at the present time. If the request for data is not a priority, the global order process determines 650 whether there is a reply for data that is being serviced before it allows the crossing case resolution process to service 630 the request for data. More specifically, one node has priority over the other node, either by request type or by each side agreeing to who has priority. A high priority is serviced without any wait, while a low priority waits for another reply to be sent. The process may service 630 the request using either a non-pipelined or a pipelined process described above in FIGS. 4a to 4b and 5a to 5c.

An advantage of handling crossing cases as in the present invention is that such cases may be resolved without discarding (or killing) subsequent processor requests. Rather, the subsequent request for data is beneficially processed after the request that preceded it. Moreover, in some instances the subsequent request is advantageously processed before the preceding request, for example, when a particular request may not be retried.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for communicating between a first node and a second node of an interconnect system, each node having a plurality of processors and an interconnect chipset, the method comprising:

issuing a processor request from a processor of the plurality of processors in the first node;

passing the processor request to the second node via a first scalability port of the first node, the first scalability port configured to communicate directly with a second scalability port of the second node when the system is a two-node system consisting of the first and second nodes, the first scalability port further configured to communicate with other nodes of the system through a protocol engine when the system is a multi-node system comprising the first node, the second node, and one or more other nodes, where the protocol engine is a part of the first node;

starting an access of a local memory in response to the processor request, and identifying the location of the contents of the object of the processor request in either the local memory or a processor cache of a processor in the plurality of processors in the second node.

2. The method of claim 1, wherein identifying the location of the contents further comprises issuing a snoop follow-up in response to the contents being in the processor cache of the processor in the plurality of processors in the second node.

3. The method of claim 2, further comprising obtaining the contents from the local memory independent of the snoop follow-up.

4. The method of claim 2, further comprising canceling the request for the contents in response to receiving the snoop follow-up.

5. A processor readable storage medium having processor readable code for programming a processor to perform a method for communicating between a first node and a second node of an interconnect system, each node having a plurality of processors and an interconnect chipset, the method comprising:

issuing a processor request from a processor of the plurality of processors in the first node;

passing the processor request to the second node via a first scalability port of the first node, the first scalability port configured to communicate directly with a second scalability port of the second node when the system is a two-node system consisting of the first and second nodes, the first scalability port further configured to communicate with other nodes of the system through a protocol engine when the system is a multi-node system comprising the first node, the second node, and one or more other nodes, where the protocol engine is a part of the first node;

starting an access of a local memory in response to the processor request, and identifying the location of the contents of the object of the processor request in either the local memory or a processor cache of a processor in the plurality of processors in the second node.

6. The processor readable storage medium of claim 5, wherein identifying the location of the contents further comprises issuing a snoop follow-up in response to the contents being in the processor cache of the processor in the plurality of processors in the second node.

7. The processor readable storage medium of claim 6, further comprising processor readable code for canceling the request for the contents in response to receiving the snoop follow-up.

* * * * *